United States Patent
Saito

(10) Patent No.: US 9,503,253 B2
(45) Date of Patent: *Nov. 22, 2016

(54) SERIAL DATA TRANSMISSION CIRCUIT AND RECEPTION CIRCUIT, TRANSMISSION SYSTEM USING THE SAME, ELECTRONIC DEVICE, AND SERIAL DATA TRANSMISSION METHOD

(71) Applicant: ROHM CO., LTD., Ukyo-ku, Kyoto (JP)

(72) Inventor: Shinichi Saito, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/994,659

(22) Filed: Jan. 13, 2016

(65) Prior Publication Data

US 2016/0127120 A1 May 5, 2016

Related U.S. Application Data

(63) Continuation of application No. 14/609,924, filed on Jan. 30, 2015, now Pat. No. 9,270,443.

(30) Foreign Application Priority Data

Jan. 31, 2014 (JP) .................................. 2014-017404

(51) Int. Cl.
*H04L 27/00* (2006.01)
*H04L 7/00* (2006.01)
*H04L 7/04* (2006.01)

(52) U.S. Cl.
CPC ............. *H04L 7/0054* (2013.01); *H04L 7/043* (2013.01)

(58) Field of Classification Search
CPC ............. H04L 27/2613; H04L 5/0053; H04L 25/03866; H04L 27/2675; H04L 7/0054; H04L 7/043; H04N 21/235
USPC ................. 375/364–366; 370/509–514, 520; 714/823

IPC .......................................................... H04J 3/06
See application file for complete search history.

(56) References Cited

U.S. PATENT DOCUMENTS

| | | | | |
|---|---|---|---|---|
| 4,860,286 A | * | 8/1989 | Forsberg | H04J 3/0605 370/510 |
| 5,506,903 A | * | 4/1996 | Yamashita | H03M 13/15 348/423.1 |
| 6,775,257 B1 | * | 8/2004 | Watanabe | H04N 21/235 370/280 |
| 2004/0160892 A1 | | 8/2004 | Agrawalla et al. | |
| 2009/0087194 A1 | * | 4/2009 | Nakashima | H04B 10/2572 398/158 |

FOREIGN PATENT DOCUMENTS

| | | |
|---|---|---|
| JP | 2000078027 A | 3/2000 |
| JP | 2007096903 A | 4/2007 |
| JP | 2012120100 A | 6/2012 |

* cited by examiner

*Primary Examiner* — Tesfaldet Bocure
(74) *Attorney, Agent, or Firm* — Cantor Colburn LLP

(57) ABSTRACT

Transmission circuit for transmitting serial data with superposed clock signal includes encoder to scramble parallel data of information and apply predetermined coding scheme to generate D symbols having clock signal embedded therein, and to output alternately continuous predetermined number of the D symbols and one of K symbols as synchronization control codes for the scrambling; and parallel-to-serial converter configured to convert the D symbols and the K symbols output from the encoder into serial data, wherein, for each period of the scrambling, the encoder outputs K symbols, each of which is allocated to one of the first code indicating beginning of the period of the scrambling, the second code allocated at equal interval among remaining ones of the K symbols other than that for the first code, and a third code allocated among remaining ones of the K symbols other than those for the first code and the second code.

17 Claims, 10 Drawing Sheets

SERIAL DATA TRANSMISSION CIRCUIT AND RECEPTION CIRCUIT, TRANSMISSION SYSTEM USING THE SAME, ELECTRONIC DEVICE, AND SERIAL DATA TRANSMISSION METHOD

CROSS-REFERENCE TO RELATED APPLICATION

This application is a continuation of U.S. patent application Ser. No. 14/609,924, filed Jan. 30, 2015 (now U.S. Pat. No. 9,270,443 issued Feb. 23, 2016), which is based upon and claims the benefit of priority from Japanese Patent Application No. 2014-017404, filed on Jan. 31, 2014, the entire contents of which are incorporated herein by reference.

TECHNICAL FIELD

The present disclosure relates to techniques of serial data transmission using a clock data recovery (CDR) circuit.

BACKGROUND

In order to transmit and receive data between semiconductor integrated circuits through a small number of data transmission lines, the techniques of serial data transmission are used. As the techniques of serial data transmission, a scheme of transmitting serial data and a clock signal through separate respective transmission lines and a scheme of superimposing a clock signal on serial data have been known.

The former scheme, which is also referred to as a clock synchronization scheme, may be employed, for example, in a low voltage differential signaling (LVDS) bus, and an inter IC ($I^2C$) bus. In this scheme, however, synchronization between the clock signal and the serial data may be lost due to an influence of jitter of the clock signal or a difference in propagation delays between the serial data and the clock signal so that it is difficult to transmit the data at a high speed exceeding 1 Gbps.

In contrast, the scheme of superimposing the clock signal on the serial data, in a transmission circuit, the serial data is encoded such that bits are changed according to a predetermined rule. A reception circuit reproduces the clock signal embedded in the serial data. In this sense, this scheme is also referred to as a CDR (Clock Data Recovery) scheme. In the CDR scheme, synchronization between the serial data and the clock signal can be maintained so that a higher transfer rate may be realized.

In order to solve the problem of electromagnetic interference (EMI) caused in the serial data transmission, a transmitter may scramble the serial data and randomize the serial data propagating through a transmission channel, thereby spreading a spectrum in the related art.

FIG. 1 shows a data format for a conventional serial data transmission adopting the scrambling. A smallest unit of data is called 1 word. In case of using an 8B10B coding scheme, 1 word is 10 bits, 8 bits of which are data corresponding to information and remaining 2 bits of which are redundancy bits for embedding the clock signal.

Image data (pixel data) may be scrambled and subsequently 8B10B coded to generate a word called a D symbol. Scramble controlling codes (K symbols) are respectively arranged at an equal interval for a plurality of D symbols. For example, each K symbol may be inserted once every ten words.

The transmission circuit may generate a pseudorandom number changing at a predetermined cycle (e.g., every one word) and performs scrambling on the image data with the pseudorandom number. The K symbols may include a first (initialization) code K0 and a second code (synchronization code) K1. The initialization code K0 may be inserted one time for each scrambling period (e.g., every 1000 words). The initialization code K0 may indicate the beginning of generating a pseudorandom number. The remaining K symbols may be allocated to the synchronization code K1.

The reception circuit may be synchronized with the transmission circuit by referring to the K symbols so that it generates the same pseudorandom number as the pseudorandom number generated by the transmission circuit and descrambles the received data using the generated pseudorandom number.

Here, if the transmission circuit and the reception circuit lose synchronization, the pseudorandom numbers generated by the transmission circuit and the reception circuit are not identical, and thus, descrambling may not be correctly performed. That is, when the synchronization is lost in the middle of a scrambling period, a reception error occurs.

The synchronization code K1 may be included once for every 10 words. Thus, even in a case in which the transmission circuit and the reception circuit lose synchronization, if a synchronization shift occurs within the front and rear 5 words, a current correct word position may be known by normally receiving the next synchronization code K1 so that the synchronization may be reestablished and the pseudorandom number may also be returned to a correct value. However, if the synchronization shift exceeds the front and rear 5 words, a correct word position may not be restored in spite of using the synchronization code K1 so that the synchronization error continues until the next initialization code K0 is correctly received.

For example, in an electronic device including a display panel, the serial data transmission may be used in transmitting image data from a frame memory storing the image data (which includes a video and a still image) to a driver circuit of the display panel. In a case where scrambling is performed for each line of image data as a unit period, when a synchronization error exceeding 10 words occurs in the middle of data transmission of a certain line, subsequent image data in that line may not be correctly displayed, which causes disturbance of an image recognized by a user.

SUMMARY

The present disclosure provides some embodiments of a transmission technique capable of resuming descrambling, even when a transmission error occurs, by establishing a synchronous state between transmission and reception sides within a short time.

According to an aspect of the present disclosure, there is provided a transmission circuit for transmitting serial data with a superimposed clock signal, including: an encoder that scrambles parallel data of information to be transmitted and applies a predetermined coding scheme to generate D symbols having a clock signal embedded therein, and outputs alternately a continuous predetermined number of the D symbols and one of K symbols that are synchronization control codes for the scrambling; and a parallel-to-serial converter that converts the D symbols and the K symbols output from the encoder into serial data. For each period of the scrambling, the encoder outputs a plurality of the K symbols each of which is allocated to one of a first code, a second code, and a third code. The first code indicates a beginning of the period of the scrambling. The second code is allocated at an equal interval among remaining ones of the K symbols other than that for the first code. The third code is allocated to the remaining K symbols other than those for the first code and the second codes.

If scrambling is performed, a reception circuit performs descrambling in synchronization with the transmission circuit based on the K symbols. According to this aspect, even if a transmission error occurs and a synchronization error exceeding a period of the third code occurs, if the synchronization error is within a range that does not exceed the interval of the second code, a current position of the serial data may be corrected based on a next second code without having to receive a next first code. Accordingly, even if a transmission error occurs, a synchronous state available for descrambling may be reestablished within a short time.

According to some embodiments, the parallel data may include pixel data forming image data. The period of the scrambling may be based on one line of the image data. If the second code is inserted M times to 1 line, a region in which disturbance of an image occurs may be suppressed to below 1/M line.

According to another aspect of the present disclosure, there is provided a reception circuit for receiving serial data with a superimposed clock signal. The serial data includes D symbols having a clock signal embedded therein that have been obtained by scrambling first parallel data of information to be transmitted and applying a predetermined coding scheme. The serial data also includes K symbols that are synchronization control codes for the scrambling and each of which is arranged at an equal interval for every predetermined number of the D symbols. For each period of the scrambling, the serial data includes a plurality of the K symbols, including a first code arranged once for the period of the scrambling, a second code arranged at an interval shorter than that for the first code, and a third code arranged at positions other than those for the first code and the second code. The reception circuit includes a serial-to-parallel converter that converts the serial data into second parallel data; and a decoder that determines whether the second parallel data is the D symbol or the K symbol, (i) when the second parallel data is the D symbol, performs decoding and descrambling of the second parallel data, and (ii) when the second parallel data is the K symbol, determines what the second parallel data is among the first to third codes to synchronize the descrambling with the scrambling in a transmission circuit based on the determined code.

According to this aspect, even if a reception error occurs and a synchronization error exceeding a period of the third code occurs, if the synchronization error is within a range that does not exceed a period of the second code, a current position of the serial data may be corrected based on a next second code without having to receive a next first code. Accordingly, a time of the reception error may be shortened to suppress disturbance of an image displayed on the display panel.

According to some embodiments, the second parallel data may include pixel data forming image data. The period of the scrambling may be based on one line of the image data.

According to some embodiments, the second parallel data may include pixel data forming image data. The reception circuit further includes an error detector that determines, based on the second parallel data generated by the serial-to-parallel converter, whether the second parallel data is correct or erroneous; a correcting buffer that, when it is determined by the error detector that the second parallel data is correct, maintains the pixel data included in the second parallel data; and a correction unit that substitutes the pixel data included in the second parallel data determined as being erroneous by the error detector with a value corresponding to the pixel data maintained in the correcting buffer. If a single pixel forming image data is considered, in many cases, luminance of the pixel is similar to luminance of a nearby pixel or similar to luminance of the same pixel in a next previous frame. Thus, in this aspect, the pixel data included in the second parallel data determined to be correct in the past is maintained as pixel data representing correct luminance. Accordingly, the pixel data included in the second parallel data determined to be erroneous, i.e., pixel data representing erroneous luminance, may be restored from the pixel data representing the correct luminance so that disturbance of an image may be suppressed.

According to some embodiments, the error detector determines whether the second parallel data is correct or erroneous based on results of the decoding of the decoder.

According to some embodiments, the first parallel data before parallel-to-serial conversion in the transmission circuit may include at least one bit for error detection. The error detector may determine whether the second parallel data is correct or erroneous based on the at least one bit for error detection.

According to some embodiments, the first parallel data before parallel-to-serial conversion may include a synchronization signal that is regularly changed over time. The error detector may determine whether the second parallel data is correct or erroneous by comparing the synchronization signal included in the second parallel data with an expected pattern.

According to some embodiments, the reception circuit may further include a synchronization signal generating unit that compares the synchronization signal with the expected pattern and correct the synchronization signal based on the expected pattern when the synchronization signal is different from the expected pattern. Accordingly, even when a transmission error occurs in a synchronization signal, an image may be correctly displayed.

According to some embodiments, the reception circuit and the transmission circuit may be integrally integrated on a single semiconductor substrate. "Integrally Integrated" may include a case in which all the components of a circuit are formed on a semiconductor substrate as well as a case in which major components of a circuit are integrally integrated and resistors, capacitors, or some other components may be installed outside of the semiconductor substrate in order to adjust circuit constants. By integrating the circuits into a single IC, a circuit area may be reduced and characteristics of a circuit element may also be uniformly maintained.

According to still another aspect of the present disclosure, there is provided a transmission system. The transmission system includes any of the transmission circuits described above and any of the reception circuits described above.

According to still another aspect of the present disclosure, there is provided an electronic device. The electronic device includes the transmission system described above.

Also, arbitrarily combining the foregoing components or converting the expression of the present disclosure between a method and an apparatus may also be valid as an aspect of the present disclosure.

DETAILED DESCRIPTION

Figure 1:
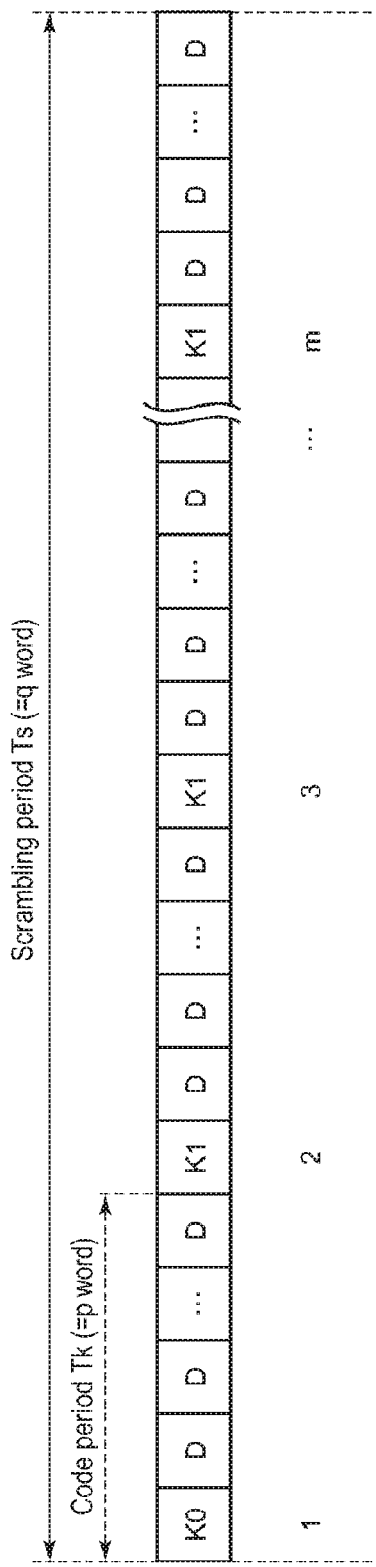
FIG. 1 shows a data format for a conventional serial transmission adopting a scrambling function.

Embodiments of the present disclosure will now be described with reference to the drawings. Throughout the drawings, the same or equivalent components, members, and processes are denoted by the same reference numerals and a repeated description thereof will be properly omitted. Also, the disclosed embodiments are merely examples and do not limit the present disclosure, and any feature or combination thereof described in the embodiments may not necessarily be essential to the present disclosure.

In the present disclosure, "a state in which a member A is connected to a member B" includes not only a case in which the member A and the member B are physically directly connected but also a case in which the member A and the member B are indirectly connected via any other member that does not affect an electrical connection state thereof.

Similarly, "a state in which a member C is installed between a member A and a member B" includes not only a case in which the member A and the member C or the member B and the member C are directly connected but also a case in which the member A and the member C or the member B and the member C are indirectly connected through any other member that does not affect an electrical connection state therebetween.

Figure 2:
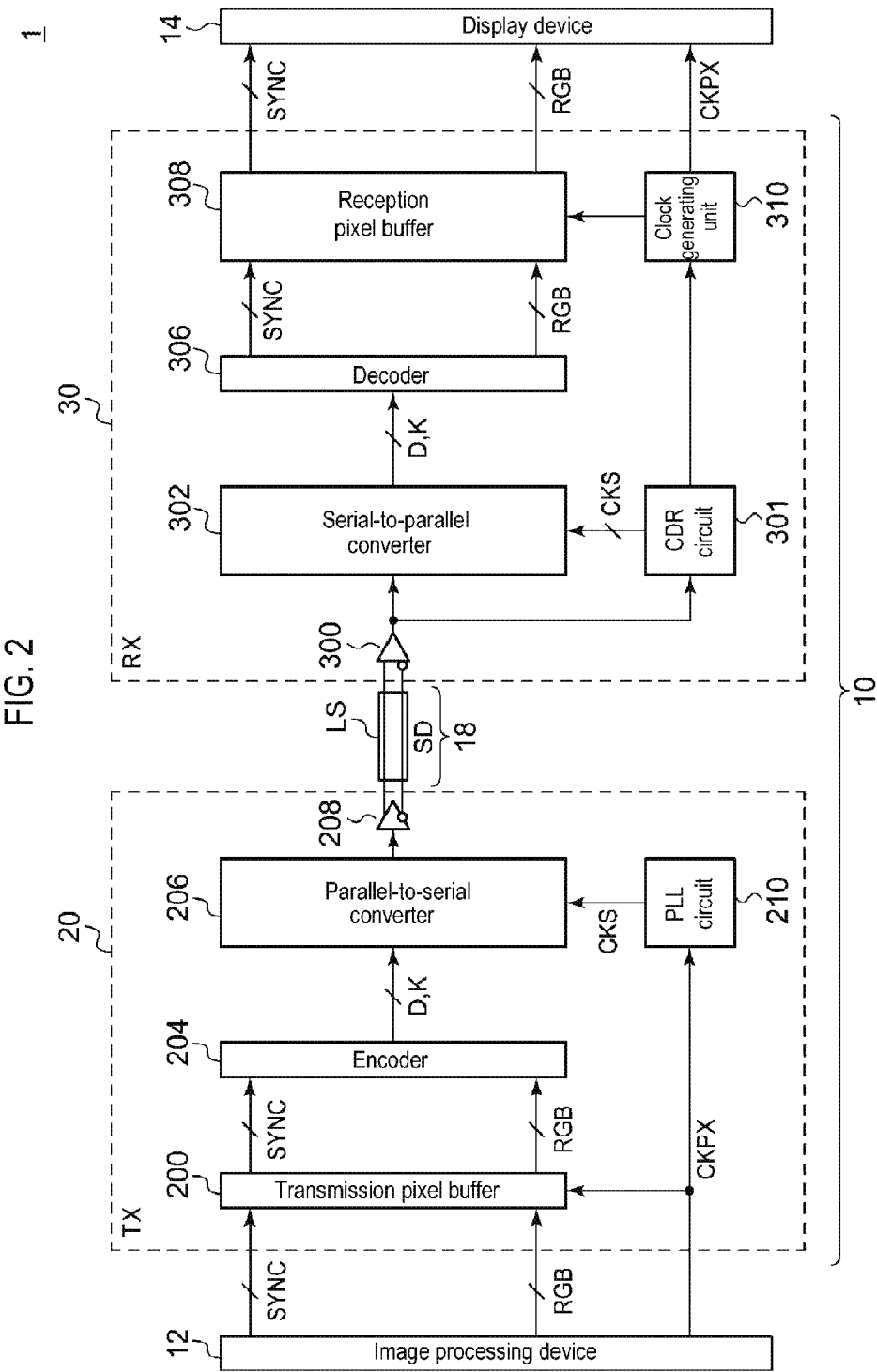
FIG. 2 is a block diagram of a transmission system according to an embodiment.

FIG. 2 is a block diagram of a transmission system 10 according to an embodiment. The transmission system 10 may be used in an electronic device 1 having a display device. The electronic device 1 may include an image processing device 12 and a display device 14 in addition to the transmission system 10. The image processing device 12 may be a central processing unit (CPU) or a graphics processing unit (GPU) and may generate image data (including a still image and a video image) to be displayed on the display device 14. In many electronic devices 1, the image processing device 12 and the display device 14 may be arranged to be separated from one another. The transmission system 10 may be used to transmit the image data from the image processing device 12 to the display device 14.

The transmission system 10 includes a transmission circuit 20, a transmission channel 18, and a reception circuit 30. The transmission circuit 20 and the reception circuit 30 may convert pixel data forming the image data into a serial format and perform high speed serial transmission through the transmission channel 18. A clock signal may be embedded in the serial data propagated through a serial lane LS forming the transmission channel 18. In FIG. 2, only the single serial lane LS is illustrated, but, in some cases, a plurality of serial lanes may be installed in parallel.

The pixel data forming the image data (hereinafter, referred to as "RGB" data) may include luminance data of three R, G, and B color subpixels included in the corresponding pixel (hereinafter, referred to as subpixel data or R data, G data, and B data). The transmission circuit 20 receives the RGB data and a pixel clock CKPX in synchronization with the RGB data from the image processing device 12. A period of the pixel clock CKPX is in proportion to a generation period of the RGB data.

Further, a synchronization signal SYNC generated by the image processing device 12 may be also received at the transmission circuit 20, in addition to the RGB data. The synchronization signal SYNC may include a horizontal synchronization signal HSYNC, a vertical synchronization signal VSYNC, and a data enable signal DE. In the case of using K symbols as described later, the data enable signal DE may be omitted.

The transmission circuit 20 includes a transmission pixel buffer 200, an encoder 204, a parallel-to-serial converter 206, and a phase locked loop (PLL) circuit 210, and may be a functional integrated circuit (IC) integrated on a single semiconductor substrate.

The transmission pixel buffer 200 may latch information, which is output from the image processing device 12 and to be transmitted to the display device 14, i.e., the pixel data RGB and the synchronization signal SYNC, by using the pixel clock CKPX, and maintains the same. The pixel data RGB and the synchronization signal SYNC may be stored in the transmission pixel buffer 200 by a unit of 8 bits.

The encoder 204 may scramble the 8 bit parallel data maintained in the transmission pixel buffer 200. Further, the encoder 204 may encode the scrambled data according to a predetermined scheme (e.g., 8B10B) and adds redundancy bits thereto to embed a clock signal. The generated data is called a D symbol (or D code).

The transmission pixel buffer 200 may store the pixel data RGB and the synchronization signal SYNC by a unit of 10 bits. In this case, 10B12B coding may be used.

Also, the encoder 204 may insert K symbols (also referred to as K codes) as synchronization control codes at an equal interval for every predetermined number of D symbols. The encoder 204 may output a continuous predetermined number (p−1) (where p is an integer) of D symbols and a single K symbol alternately. That is, a period of the K symbols (K code period Tk) is p words. In this embodiment, it is assumed that p=10.

The K code is set to be distinguished from the D code. For example, the D code generated through 8B10B coding or 10B12B coding may be level-shifted in a ratio of once for a predetermined number of bits. Thus, the K code may be generated to maintain 1 or 0 over a number of bits exceeding the predetermined number of bits.

Scrambling will now be described. The encoder 204 may be initialized at every predetermined number of words q (hereinafter, referred to as a scrambling period Ts) and may generate a pseudorandom number (scramble code) changing at every predetermined number of words r (hereinafter, referred to as a transition period Tt). Then, the encoder 204 may perform the scrambling on the data stored in the transmission pixel buffer 200 with the pseudorandom number. In this embodiment, the scrambling period Ts is set to q=1000 words. Also, the transition period Tt is set to r=1 word, but in modified examples, r may be 2 or greater.

In order to generate the pseudorandom number, a linear feedback shift register (LFSR) may be used. In this case, data within the register is shifted at every transition period Tt, i.e. at every one word. The encoder 204 may perform the scrambling by applying an XOR operation on the pseudorandom number and the parallel data. Further, there is no particular limitation on scrambling methods.

Figure 3A:
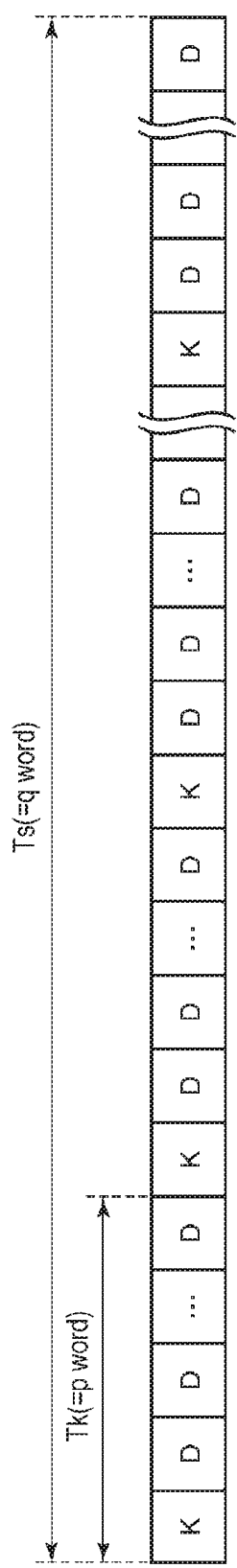
FIGS. 3A and 3B are views illustrating arrangements of symbols D and K generated by an encoder.
Figure 3B:
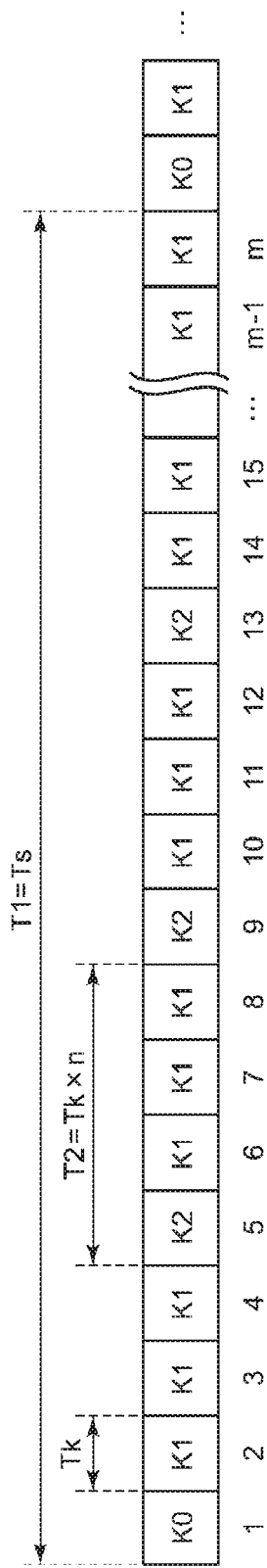

FIGS. 3A and 3B are views illustrating arrangements of D symbols and K symbols generated by the encoder 204. As illustrated in FIG. 3A, a K symbol (K) and a plurality (p−1) of continuous D symbols are alternately arranged in a scrambling period Ts. In the scrambling period Ts, m (=q/p) number of K symbols are included. In this embodiment, m=100.

FIG. 3B illustrates only the K symbols extracted from the data of FIG. 3A. The m number of K symbols included in the scrambling period Ts includes the first code (hereinafter, referred to as an initialization code) K0, the second code (hereinafter, referred to as a higher synchronization code) K2, and the third code (hereinafter, referred to as a lower synchronization code) K1, which are distinguishable from one another.

The initialization code K0 indicates a beginning of the scrambling period Ts. The higher synchronization code K2 may be allocated among remaining K symbols, other than that for the initialization code K0, at an equal interval. The lower synchronization code K1 may be allocated to remaining K symbols, other than those for the initialization code K0 and the higher synchronization code K2.

The initialization code K0 may be the first K symbol. Each higher synchronization code K2 may be allocated for every predetermined n number of K symbols. That is, $(1+n \times j)^{th}$ K symbol may be the higher synchronization code K2. Here, j=0, 1, 2, .... The remaining K symbols may be allocated to the lower synchronization code K1. In this embodiment, it is assumed that n=4.

The first period T1, as the period of the initialization code K0, is equal to the scrambling period Ts (i.e., q words). The third period T3, as the period of the lower synchronization code K1, is equal to the K code period Tk (i.e., p words). The second period T2, as the period of the higher synchronization code K2, is equal to Tk×n (i.e., p×n words).

The PLL circuit 210 multiplies the pixel clock CKPX to generate a serial clock CKS. The parallel-to-serial converter 206 converts sequentially parallel-to-serial the D symbols or the K symbols outputted from the encoder 204 in synchronization with the serial clock CKS. A differential driver 208 outputs serial data SD to the serial lane LS.

Next, the reception circuit 30 will be described. The reception circuit 30 includes a differential receiver 300, a CDR circuit 301, a serial-to-parallel converter 302, a decoder 306, a reception pixel buffer 308, and a clock generating unit 310, and may be a functional IC integrated on a single semiconductor substrate.

The differential receiver 300 may receive the serial data SD and determines whether each bit is a high level or a low level. The CDR circuit 301 may monitor output from the differential receiver 300 to extract a clock signal embedded in the serial data SD, and reproduces a sampling clock CKS.

The serial-to-parallel converter 302 converts the serial data SD received by the differential receiver 300 into parallel data. An output of the serial-to-parallel converter 302 is a D symbol or a K symbol.

The decoder 306 may perform 8B10B decoding on the D symbol. The decoder 306 has a pseudorandom number generating unit (e.g., the LFSR) that is the same as that included in the encoder 204. The decoder 306 may generate the pseudorandom numbers that change in synchronization with those used in the transmission circuit 20 based on the K symbols and descrambles the D symbols using the generated pseudorandom numbers. Specifically, when the initialization code K0 is received, the decoder 306 may initialize the pseudorandom number, and thereafter, the decoder 306 may change the pseudorandom number at every one word.

The clock generating unit 310 may generate a pixel clock CKPX having the same frequency as that of the pixel clock CKPX of the transmission circuit 20. Processing after the reception pixel buffer 308 may be performed in synchronization with the pixel clock CKPX.

The reception pixel buffer 308 may store the synchronization signal SYNC and the pixel data RGB decoded by the decoder 306. This information may be sequentially output to the display device 14.

The configuration of the transmission system 10 has been described. Next, operations of the transmission system 10 will be described.

Figure 4A:
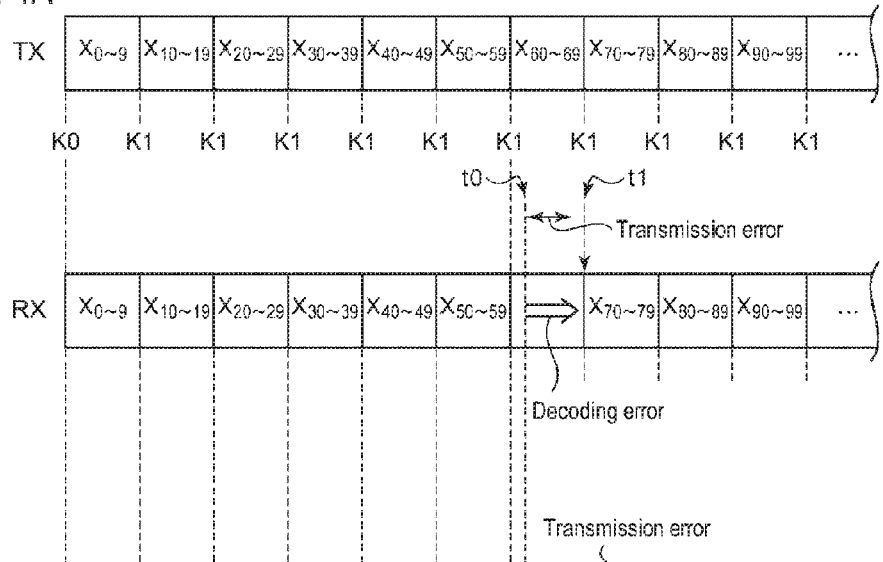
FIGS. 4A and 4B are operational waveform views of a conventional transmission system.
Figure 4B:
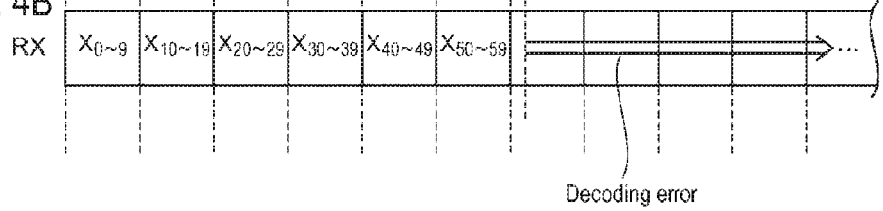
Figure 4C:
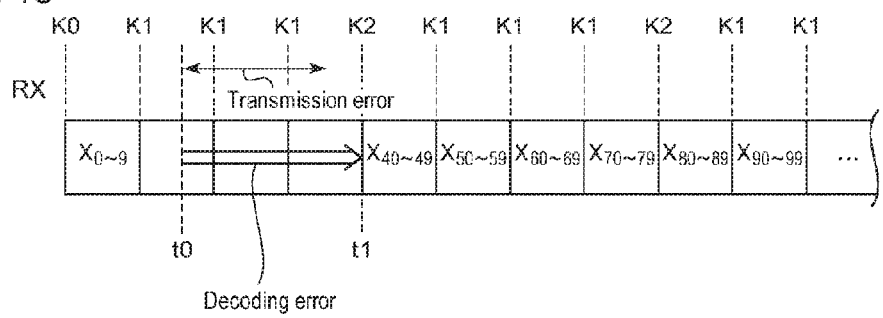
FIG. 4C is an operational waveform view of the transmission system of FIG. 2.

FIGS. 4A and 4B are operational waveform views of a conventional transmission system. FIG. 4C is an operational waveform view of the transmission system 10 of FIG. 2.

The problem of the conventional transmission system will be described again with reference to FIGS. 4A and 4B. As mentioned above, the initialization code K0 is allocated at the beginning of the scrambling period and thereafter, the synchronization code K1 is allocated. $X_{0-9}$ and $X_{10-19}$, for example, denote the pseudorandom numbers TX and RX respectively generated by the encoder of the transmission circuit and the decoder of the reception circuit. When the initialization code K0 is received, the pseudorandom number is initialized to $X_0$ and then, the pseudorandom number transitions to $X_1, X_2, X_3 \ldots$ at every one word. When the K symbol is correctly received, the pseudorandom number X of the reception side is identical to that of the transmission side.

However, when a transmission error occurs in a certain cycle t0 so that receiving of the synchronization code K1 fails, the scrambler of the transmission circuit and the descrambler of the reception circuit lose synchronization, which causes inconsistency of the pseudorandom numbers X. Thus, a decoding error occurs.

FIG. 4A illustrates a state in which a transmission error for a shorter time than the K code period Tk, occurs between 60 to 70 words. In this case, the decoding error continues from a time t0 at which the transmission error occurs to a time t1 at which the synchronization code K1 is correctly received next. After the time t1 at which the synchronization code K1 is correctly received, data may be correctly descrambled.

FIG. 4B illustrates a state in which a synchronization error for a longer time than the K code period Tk, occurs between 60 to 80 words to cause the failure of receiving the synchronization code K1. Once it fails to receive the synchronization code K1, the reception circuit does not know a position of serial data until the next initialization code K0 is correctly received. That is, a decoding error continues for a long period of time.

Advantages of the transmission system 10 of FIG. 2 will be described with reference to FIG. 4C. When a transmission error occurs at a certain time t0 and thus the transmission and reception circuits lose synchronization, a decoding error occurs. Then, a higher synchronization code K2 is transmitted from the transmission circuit 20 at a time t1 and the reception circuit 30 correctly receives it. As described above, assuming a case where the initialization code K0 is allocated for the $i^{th}$ and the higher synchronization code K2 is allocated once at every n number of K symbols, the higher synchronization code K2 is to be allocated for a $(i+n\times j)^{th}$ K symbol, i.e., for a $((i+n\times j)\times p)^{th}$ word. As such, since the reception circuit 30 can find a position of the higher synchronization code K2 in the serial data, the reception circuit 30 may correct the current position of the serial data based on the higher synchronization code K2 and restore the pseudorandom number to a correct value $X_{40}$. Accordingly, descrambling may be performed correctly after the time t1. The operation of the transmission system 10 has been described.

According to the transmission system 10 of the embodiment, by allocating the higher synchronization code K2 at a frequency higher than (a shorter interval) that of the initialization code K0, in the case of a transmission error that is shorter than the period T2 of the higher synchronization code K2, a continuation time of a decoding error caused by the transmission error may be shortened to be within the period of the higher synchronization code K2. Accordingly, disturbance of an image recognized by a user may be prevented.

Figure 9:
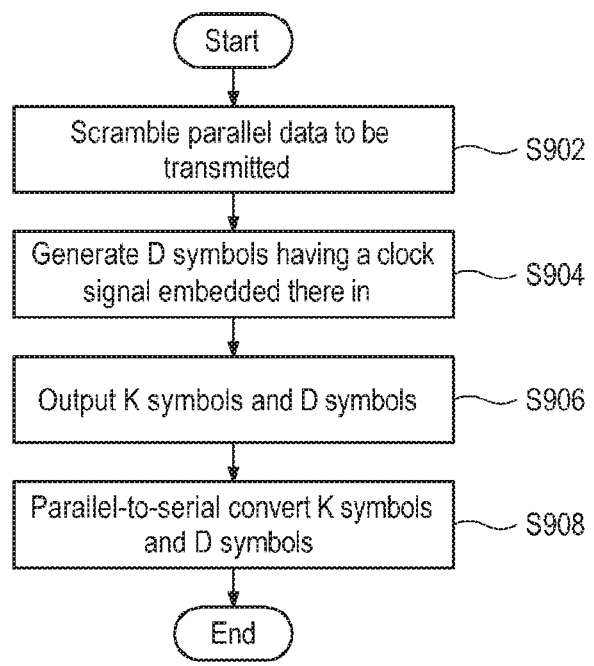
FIG. 9 is a flow chart illustrating an example process, which may be performed n transmission circuit 20 of FIG. 2 according to one embodiment.

FIG. 9 is a flow chart illustrating an example process for transmitting serial data, which may be performed in the transmission circuit 20 of FIG. 2 according to one embodiment.

As illustrated in FIG. 9, parallel data of information to be transmitted is scrambled at the transmission circuit (S902). A predetermined coding scheme is applied to the scrambled data to generate D symbols having a clock signal embedded therein (S904). For a period of the scrambling, K symbols, each of which is a synchronization control code for the scrambling, and D symbols are outputted in a manner that a continuous predetermined number of the D symbols are outputted after one of the K symbols is outputted (S906). A first code may be allocated to one of the K symbols to indicate a beginning of the period of the scrambling. A second code may be allocated among remaining ones of the K symbols other than that for the first code. A third code may be allocated among remaining ones of the K symbols other than those for the first code and the second codes. Then, the K symbols and the D symbols outputted are parallel-to-serial converted into serial data to be transmitted to a reception circuit (S908).

Figure 10:
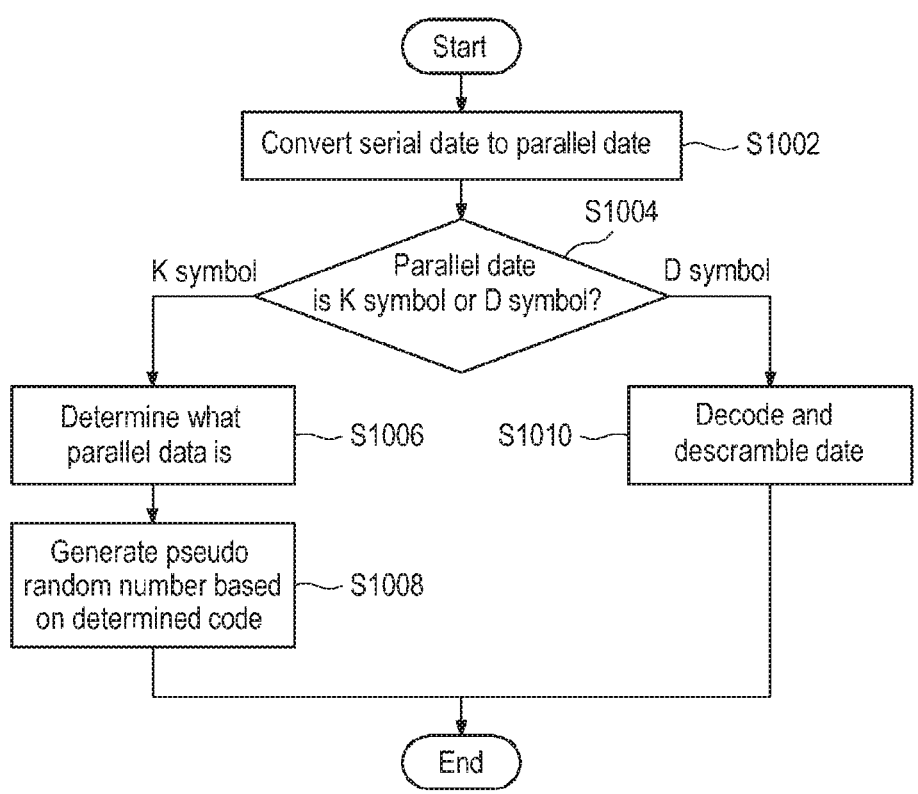
FIG. 10 is a flow chart illustrating an example process, which may be performed in the reception circuit 30 of FIG. 2 according to one embodiment.

FIG. 10 is a flow chart illustrating an example process for receiving serial data, which may be performed in the reception circuit 30 of FIG. 2 according to one embodiment.

As depicted, the received serial data is converted into parallel data (S1002). Then, it is determined whether the second parallel data s the D symbol or the K symbol (S1004). When it is determined that the parallel data is the K symbol, is determined what the parallel data is among the first to third codes (S1006). Then, based on the determined code, a pseudorandom number is generated (S1008). When it is determined that the parallel data is the D symbol, the parallel data is decoded and descrambled in synchronization with the transmission circuit based on the pseudorandom number (S1010).

The present disclosure has been described based on the embodiment. The embodiment is illustrative and there may be various modified examples of each component, each process, and a combination thereof. Hereinafter, such modified examples will be described.

MODIFIED EXAMPLE 1

Figure 5:
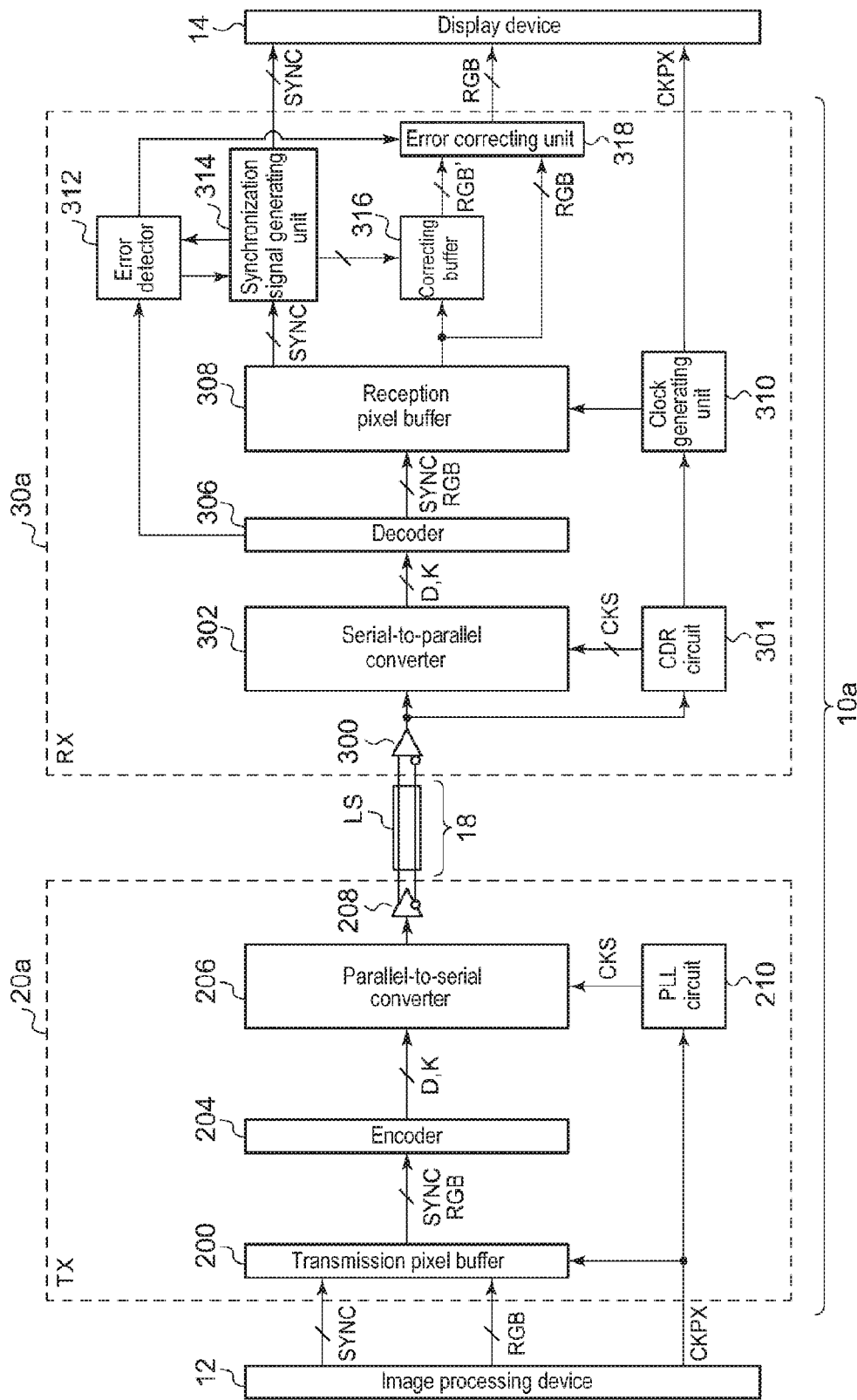
FIG. 5 is a block diagram of a transmission system according to a modified example 1.

FIG. 5 is a block diagram of a transmission system 10a according to a modified example 1. A transmission circuit 20a is the same as the transmission circuit 20 of FIG. 2. Serial data generated according to 8B10B or 10B12B coding may have a format allowing for detection of a transmission error by a reception circuit 30a.

The reception circuit 30a includes an error detector 312, a synchronization signal generating unit 314, a correcting buffer 316, and an error correcting unit 318, in addition to the reception circuit 30 of FIG. 2.

The error detector 312 may determine whether there is a transmission error based on parallel data generated by the serial-to-parallel converter 302. When a transmission error is detected, the error detector 312 may determine that the parallel data is not correct. When a transmission error is not detected, the error detector 312 may determine that the parallel data is correct. As described above, in the case of using the 8B10B or 10B12B coding, a pattern to be taken by the D symbols has already been set. Further, a pattern to be taken by the K symbols has also already been set. Thus, if received data is not identical to any pattern, it may be determined as the transmission error (decoding error).

Also, as described above, the transmission circuit 20a scrambles the D symbols. Thus, if an error is detected during the descrambling by the decoder 306, the error detector 312 may determine that there is a transmission error (scrambling error).

The synchronization signal generating unit 314 may receive the synchronization signal SYNC and outputs the synchronization signal SYNC to the display device 14. Here, the synchronization signal SYNC, specifically, the vertical synchronization signal VSYNC, the horizontal synchronization signal HSYNC, or the enable signal DE is regularly changed over time. Thus, the reception circuit 30 may estimate a correct value (an expected pattern) to be taken by the synchronization signal SYNC with respect to each pixel. Thus, the error detector 312 may determine whether the respective parallel data is correct or erroneous by comparing the synchronization signal SYNC with the expected pattern.

For example, in relation to a certain synchronization signal SYNC, consider four continuous pixels. It may not happen that the synchronization signal SYNC changes twice within the four continuous pixels. Thus, by monitoring a level change (edge) of the synchronization signal SYNC, if two or more level changes are detected within the four continuous pixels, it may be determined as a transmission error (synchronization error).

Further, the synchronization signal generating unit 314 may correct the synchronization signal SYNC based on the result of comparing the synchronization signal SYNC and the expected pattern. That is, when the received synchronization signal SYNC is not consistent with the expected pattern, the synchronization signal generating unit 314 may correct the synchronization signal SYNC based on the expected pattern. Accordingly, even when a transmission error occurs in the synchronization signal SYNC, a correct synchronization signal SYNC may be reproduced to correctly display an image.

When the parallel data is determined to be correct by the error detector 312, the correcting buffer 316 maintains the pixel data RGB included in the corresponding parallel data. For example, the correcting buffer 316 may be a line buffer for maintaining pixel data of 1 line portion running back from the currently received pixel. For example, if the display device 14 has a display region of 640×480 pixels, the line buffer may maintain pixel data RGB of an immediately previous continuous 640-pixel portion. In a case where incorrect pixel data RGB is generated for a certain pixel, correct pixel data RGB for a nearby pixel may be stored in the line buffer.

The error correcting unit 318 may substitute the pixel data RGB included in the parallel data that is determined to be erroneous by the error detector 312 with a value corresponding to pixel data RGB' stored in the correcting buffer 316.

The corrected RGB data is supplied to the display device 14 at the next stage.

So far, the configuration of the transmission system 10a has been described. Subsequently, an operation thereof will be described.

As described above, serial data SD1 to SD4 transmitted via the transmission channel 18 has a format allowing for the error detection by the reception circuit 30. Further, the error detector 312 may detect a transmission error based on an error detection code EDB.

The pixel data stored in the correcting buffer 316 may be updated depending on whether the error detector 312 detects an error or not. The error correcting unit 318 may select the pixel data RGB' stored in the correcting buffer 316 if a transmission error is detected or alternatively may select the pixel data RGB' of the reception pixel buffer 308 if a transmission error is not detected so that a value corresponding to the selected pixel data is output to the display device 14.

Processing performed by the error correcting unit 318 will be described.

(First Correction Processing)

Figure 6:
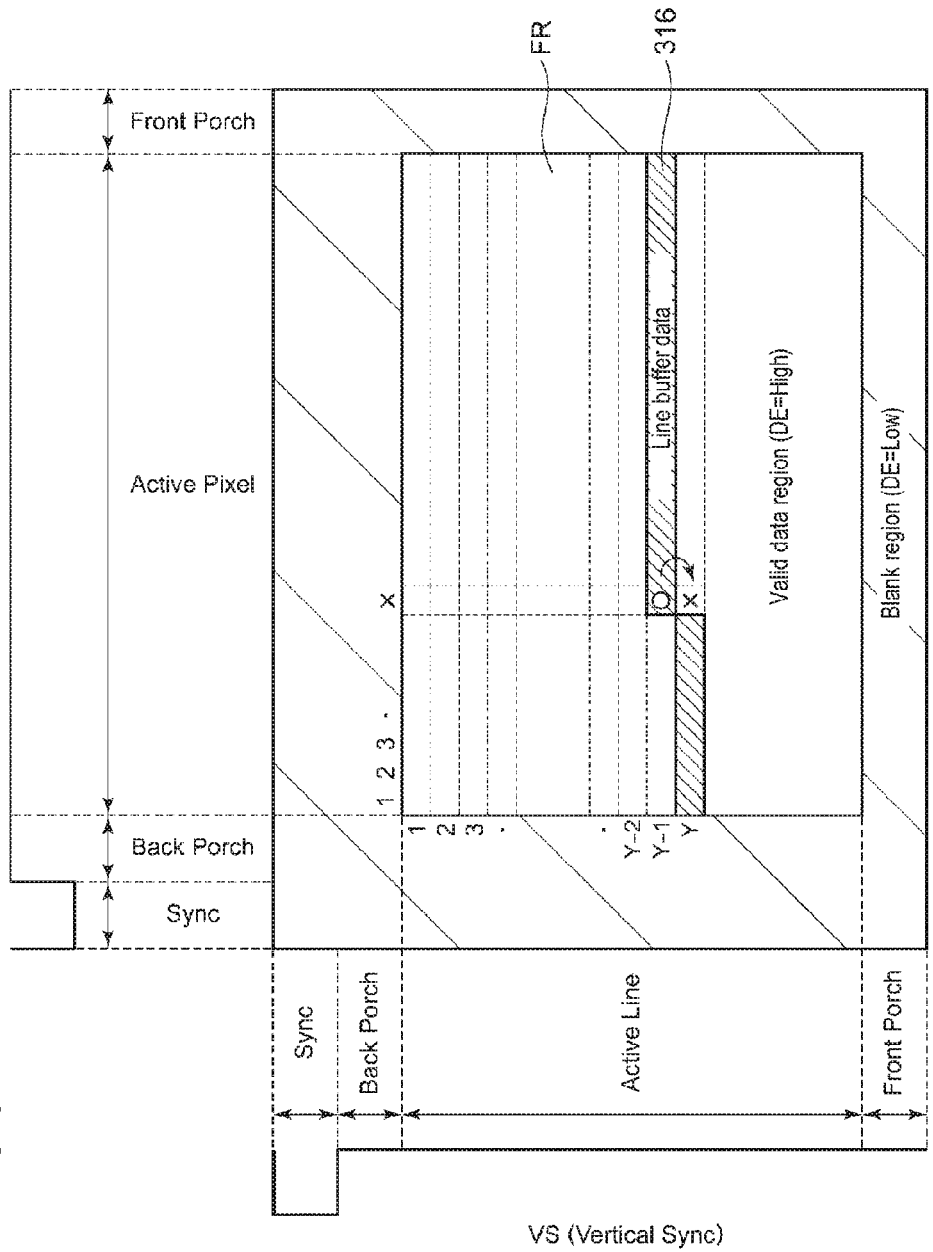
FIG. 6 is a view illustrating a first correction processing.

FIG. 6 is a view illustrating first correction processing. For example, the error correcting unit 318 substitutes the pixel data RGB included in the parallel data determined to be erroneous by the error detector 312 with the pixel data RGB' stored in the correcting buffer 316. In FIG. 6, coordinates (X, Y) denote currently received pixels. The pixel data RGB' is pixel data in the vicinity of the error-detected pixel. The nearby pixel may be a pixel PH adjacent in a horizontal direction (a leftward direction) or a pixel PV adjacent in a vertical direction (an upward direction) of one previous line.

Further, with respect to pixels of a first row, there is no line adjacent in an upward direction. Thus, the correcting buffer 316 may additionally maintain pixel data of the first row of the next previous frame. Accordingly, it is also possible to achieve correction based on the past frame data FR.

(Second Processing)

The error correcting unit 318 may substitute the pixel data RGB included in the parallel data determined to be erroneous by the error detector 312 with a value calculated from the pixel data RGB' stored in the correcting buffer 316. For example, a value obtained by averaging a plurality of pixel data RGB' in the vicinity of the current pixel (X, Y) may be used.

(Third Processing)

The correcting buffer 316 may maintain pixel data for one frame portion, rather than one line portion. In this case, the correcting buffer 316 may correct the currently erroneous data with reference to pixel data of the same pixel in the next previous frame.

So far, the operation of the transmission system 10a has been described. If a pixel forming image data is considered, in many cases, luminance of the pixel may be similar to luminance of a nearby pixel or similar to luminance of the same pixel in next previous frame. The correcting buffer 316 maintains pixel data included in the parallel data determined to be correct in the past, as pixel data representing correct luminance. Accordingly, the pixel data included in the parallel data determined to be erroneous, i.e., pixel data representing erroneous luminance, may be restored from the pixel data representing the correct luminance so that disturbance of an image may be suppressed.

MODIFIED EXAMPLE 2

Figure 7:
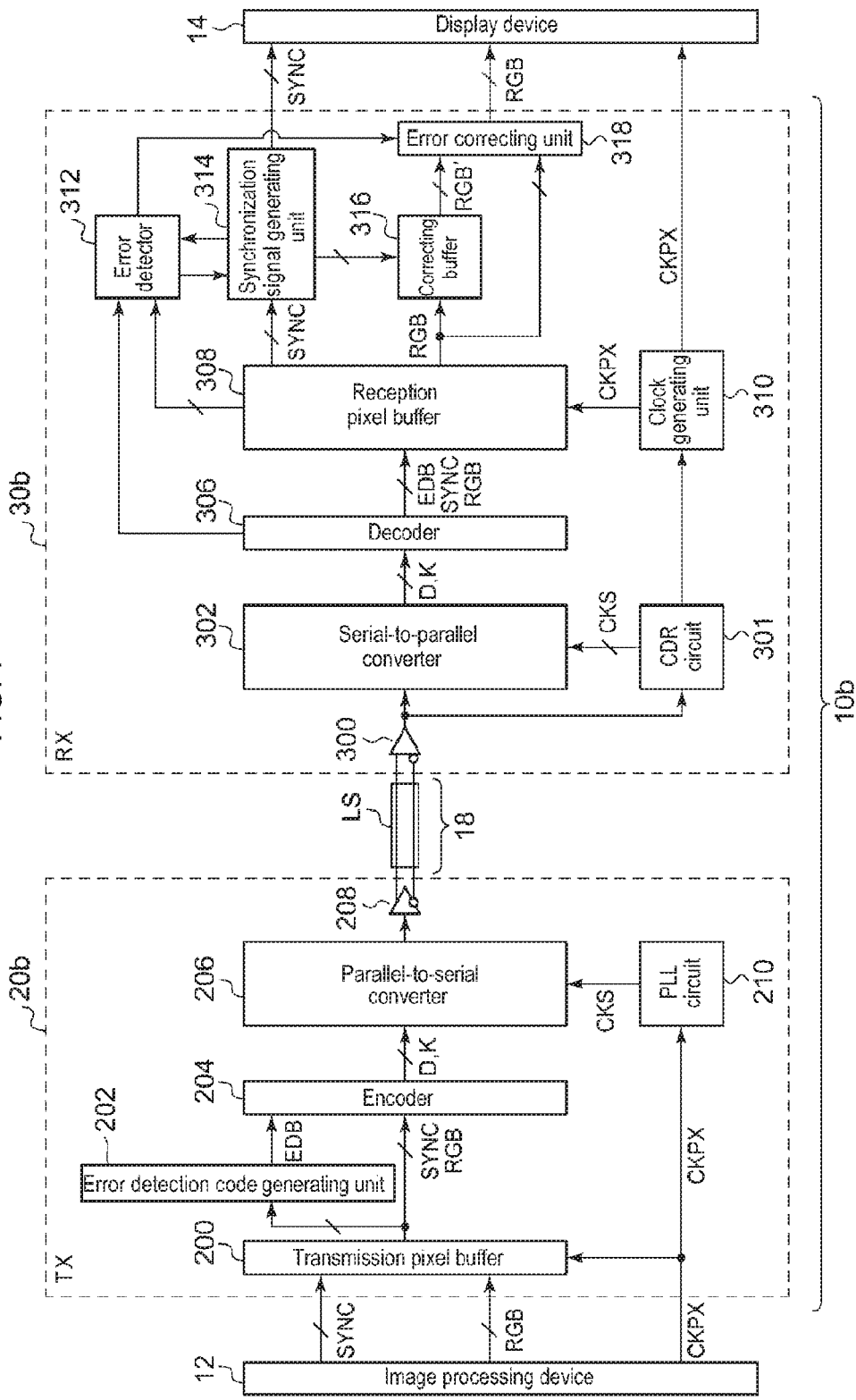
FIG. 7 is a block diagram of a transmission system according to a modified example 2.

FIG. 7 is a block diagram of a transmission system 10b according to a modified example 2. A transmission circuit 20b of FIG. 7 includes an error detection code generating unit 202 in addition of the transmission circuit 20a of FIG. 5.

The error detection code generating unit 202 may perform signal processing required to allow a reception circuit 30b to detect a transmission error. Specifically, the error detection code generating unit 202 may generate an error detection bit (EDB) embedded in serial data transmitted via the transmission channel 18. An error detection may be performed by using a known technique and is not particularly limited in the present disclosure. For example, a check sum data scheme, a parity bit scheme, a block check character (BCC) scheme, or a cyclic redundancy check (CRC) may be used. The error detection code EDB may be included in the D symbol.

Subsequently, the reception circuit 30b will be described. In the reception circuit 30b of FIG. 7, the error detector 312 may determine whether there is a transmission error or not with reference to the error detection code EDB stored in the reception pixel buffer 308. The error detector 312 may determine that parallel data is not correct if a transmission error is detected and alternatively, may determine that the parallel data is correct if a transmission error is not detected.

According to this modified example, a transmission error may be detected based on an error detection code EDB, in addition to or in the place of a decoding error, a descrambling error, and a synchronization error, and image data may be corrected.

MODIFIED EXAMPLE 3

Among the higher synchronization codes K2, some may be selected at equal intervals to have a code K2a that is set to a value distinguishable from the other higher synchronization code K2b. In this case, when a transmission error for a time that is longer than the period of the code K2b and shorter than the period of code K2a occurs, a duration of a decoding error may be set to be shorter than the period of K2a.

MODIFIED EXAMPLE 4

In the embodiments, transmitting the image data has been described. However the present disclosure is not limited thereto and may also be applied to any other types of data transmission.

Figure 8:
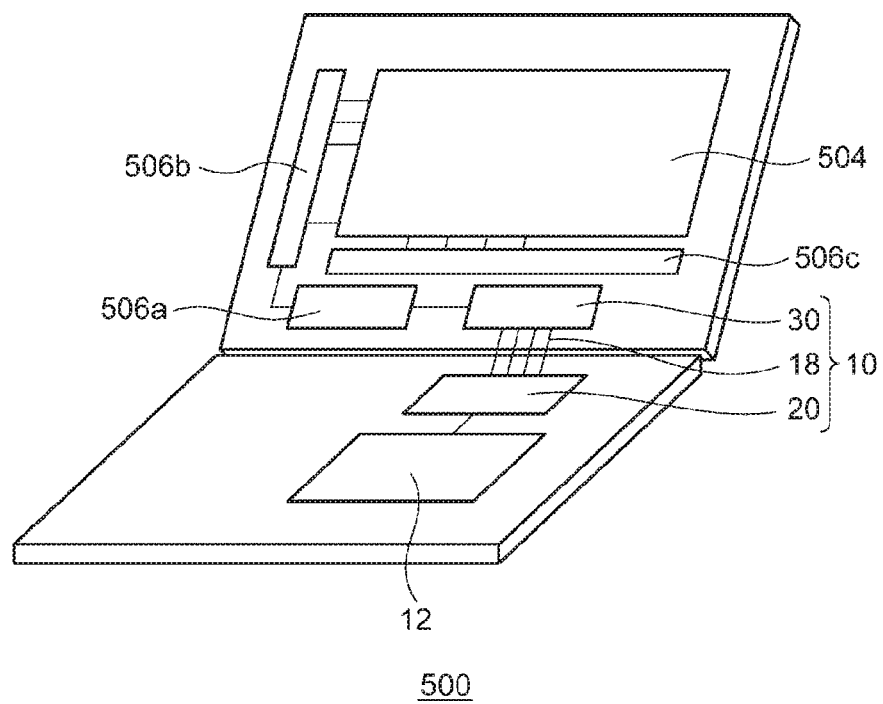
FIG. 8 is a perspective view illustrating an electronic device.

Finally, the purpose of the transmission system 10 will be described. FIG. 8 is a perspective view illustrating an electronic device. The electronic device 500 of FIG. 8 may be a notebook PC, a tablet terminal, a smartphone, a portable game device, or an audio player. The electronic device 500 may include an image processing device 12, a transmission system 10, and a display device 14, all of which are installed in a case 502. The display device 14, specifically, may include a display panel 504 and a driving circuit 506. The driving circuit 506 may include a timing controller 506a, a gate driver 506b, and a data driver 506c.

Alternatively, the transmission system 10 may be used to transmit data to a display installed in a car navigation system or a console panel for a vehicle. In a vehicle, since strong tolerance to noise is required, the transmission system 10 may be appropriately used. Further, the transmission system 10 may be used, for example, for a Pachinko game machine. In the Pachinko game machine, when a ball is hit by a nail, noise is generated to cause a transmission error. The use of the transmission system 10 may reduce image disturbance.

According to the present disclosure, even if a transmission error occurs, a synchronous state available for descrambling may be reestablished within a short time.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A transmission circuit for transmitting serial data with a superimposed clock signal, comprising:
    an encoder configured to scramble parallel data of information to be transmitted and apply a predetermined coding scheme to generate first data having a clock signal embedded therein, and also configured to output alternately a continuous predetermined number of the first data and synchronization control codes for the scrambling; and
    a parallel-to-serial converter configured to convert the first data and the synchronization control codes output from the encoder into serial data,
    wherein, for each period of the scrambling, the encoder outputs a plurality of the synchronization control codes, each of which is allocated to one of a first code, a second code, and a third code,
    wherein the first code indicates a beginning of the period of the scrambling,
    wherein the second code is arranged at an interval shorter than that for the first code; and
    wherein the third code is arranged at positions other than those for the first code and the second code.

2. The transmission circuit of claim 1, wherein the parallel data comprises pixel data forming image data, and the period of the scrambling is based on one line of the image data.

3. A reception circuit for receiving serial data with a superimposed clock signal,
    wherein the serial data includes first data having a clock signal embedded therein that have been obtained by scrambling first parallel data of information to be transmitted and applying a predetermined coding scheme, and also includes synchronization control codes for the scrambling,
    wherein each of the synchronization control codes is arranged at an equal interval for every predetermined plural number of the first data,
    wherein, for each period of the scrambling, the serial data includes a plurality of the synchronization control codes, including,
    a first code inserted once for the period of the scrambling;
    a second code arranged at an interval shorter than that for the first code; and
    a third code arranged at positions other than those for the first code and the second code, and
    the reception circuit comprising:
    a serial-to-parallel converter configured to convert the serial data into second parallel data; and
    a decoder configured to determine whether the second parallel data is the first data or the synchronization control codes, (i) when the second parallel data is the first data, perform decoding and descrambling of the second parallel data, and (ii) when the second parallel data is the synchronization control codes, determine what the second parallel data is among the first to third codes to synchronize the descrambling with the scrambling in a transmission circuit based on the determined code.

4. The reception circuit of claim 3, wherein the second parallel data comprises pixel data forming image data, and the period of the scrambling is based on one line of the image data.

5. The reception circuit of claim 3, wherein the second parallel data comprises pixel data forming image data, and,
    wherein the reception circuit further comprises:
    an error detector configured to determine, based on the second parallel data generated by the serial-to-parallel converter, whether the second parallel data is correct or erroneous;
    a correcting buffer configured to, when it is determined by the error detector that the second parallel data is correct, maintain the pixel data included in the second parallel data; and
    a correction unit configured to substitute the pixel data included in the second parallel data determined as being erroneous by the error detector with a value corresponding to the pixel data maintained in the correcting buffer.

6. The reception circuit of claim 5, wherein the error detector is configured to determine whether the second parallel data is correct or erroneous based on results of the decoding or the descrambling by the decoder.

7. The reception circuit of claim 5, wherein the first parallel data before parallel-to-serial conversion in the transmission circuit comprises at least one bit for error detection, and
    wherein the error detector is configured to determine whether the second parallel data is correct or erroneous based on the at least one bit for error detection.

8. The reception circuit of claim 5, wherein the first parallel data before parallel-to-serial conversion comprises a synchronization signal that is regularly changed over time, and
    wherein the error detector is configured to determine whether the second parallel data is correct or erroneous by comparing the synchronization signal comprised in the second parallel data with an expected pattern.

9. The reception circuit of claim 8, further comprising:
    a synchronization signal generating unit configured to compare the synchronization signal with the expected pattern and correct the synchronization signal based on the expected pattern when the synchronization signal is different from the expected pattern.

10. A transmission system, comprising:
    a transmission circuit for transmitting serial data with a superimposed clock signal, comprising:
    an encoder configured to scramble parallel data of information to be transmitted and apply a predetermined coding scheme to generate first data having a clock signal embedded therein, and also configured to output alternately a continuous predetermined number of the first data and synchronization control codes for the scrambling; and a parallel-to-serial converter configured to convert the first data and the synchronization control codes output from the encoder into serial data, wherein, for each period of the scrambling, the encoder outputs a plurality of the synchronization control codes, each of which is allocated to one of a first code, a second code, and a third code, wherein the first code indicates a beginning of the period of the scrambling, wherein the second code is arranged at an interval shorter than that for the first code; and wherein the third code is arranged at positions other than those for the first code and the second code; and a reception circuit for receiving serial data with a superimposed clock signal, wherein the serial data includes first data having a clock signal embedded therein that have been obtained by scrambling first parallel data of information to be transmitted and applying a predetermined coding scheme, and also includes synchronization control codes for the scrambling, wherein each of the synchronization control codes is arranged at an equal interval for every predetermined plural number of the first data, wherein, for each period of the scrambling, the serial data includes a plurality of the synchronization control codes, including, a first code inserted once for the period of the scrambling;

a second code arranged at an interval shorter than that for the first code; and a third code arranged at positions other than those for the first code and the second code, and the reception circuit comprising:

a serial-to-parallel converter configured to convert the serial data into second parallel data; and a decoder configured to determine whether the second parallel data is the D symbol first data or the synchronization control codes, (i) when the second parallel data is the first data, perform decoding and descrambling of the second parallel data, and (ii) when the second parallel data is the synchronization control codes, determine what the second parallel data is among the first to third codes to synchronize the descrambling with the scrambling in a transmission circuit based on the determined code.

11. An electronic device comprising the transmission system of claim 10.

12. A method of transmitting serial data, comprising:

in a transmission circuit, scrambling first parallel data of information to be transmitted and applying a predetermined coding scheme to generate first data having a clock signal embedded therein;

in the transmission circuit, alternately arranging a predetermined number of continuous first data and a synchronization control codes, the synchronization control codes being a synchronization control code for the scrambling; and in the transmission circuit, parallel-to-serial converting the first data and the synchronization control codes into serial data and transmitting the serial data to a reception circuit;

in the reception circuit, converting the serial data into second parallel data;

determining whether the second parallel data is the first data or the synchronization control codes; and in the reception circuit, (i) when the second parallel data is the first data, decoding and descrambling the second parallel data, (ii) when the second parallel data is the synchronization control codes, determining what the second parallel data is among the first to third codes to synchronize the descrambling with the scrambling in the transmission circuit based on the determined code, and wherein, for each period of the scrambling, the transmission circuit arranges a plurality of the synchronization control codes, the plurality of the synchronization control codes including, a first code indicating a beginning of the period of the scrambling;

second codes each of which is arranged at an interval shorter than that for the first code; and third codes arranged at positions other than those for the first code and the second code.

13. The method of claim 12, wherein the second parallel data comprises pixel data forming image data, and wherein the method further comprises:

in the reception circuit, determining, based on the second parallel data, whether the second parallel data is correct or erroneous;

in the reception circuit, when it is determined that the second parallel data is correct, maintaining the pixel data included in the second parallel data in a correcting buffer; and substituting the pixel data included in the second parallel data determined as being erroneous with a value corresponding to the pixel data maintained in the correcting buffer.

14. The method of claim 13, wherein the determining whether the second parallel data is correct or erroneous comprises determining whether the second parallel data is correct or erroneous based on results of the decoding or the descrambling.

15. The method of claim 13, wherein the first parallel data before parallel-to-serial conversion in the transmission circuit comprises at least one bit for error detection, and wherein the determining whether the second parallel data is correct or erroneous comprises determining whether the second parallel data is correct or erroneous based on the at least one bit for error detection.

16. The method of any one of claim 13, wherein the first parallel data before parallel-to-serial conversion in the transmission circuit comprises a synchronization signal that is regularly changed over time, and wherein the determining whether the second parallel data is correct or erroneous comprises determining whether the second parallel data is correct or erroneous by comparing the synchronization signal comprised in the second parallel data with an expected pattern.

17. The method of claim 16, further comprising:

in the reception circuit, comparing the synchronization signal with the expected pattern and correcting the synchronization signal based on the expected pattern when the synchronization signal is different from the expected pattern.

* * * * *